(12) United States Patent
Hoppe et al.

(10) Patent No.: US 10,900,386 B2
(45) Date of Patent: Jan. 26, 2021

(54) CAMSHAFT ADJUSTMENT DEVICE FOR AN INTERNAL COMBUSTION ENGINE

(71) Applicant: Schaeffler Technologies AG & Co. KG, Herzogenaurach (DE)

(72) Inventors: Jens Hoppe, Erlangen (DE); Ye Bai, Nuremberg (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 16/486,167

(22) PCT Filed: Mar. 8, 2018

(86) PCT No.: PCT/DE2018/100209
§ 371 (c)(1),
(2) Date: Aug. 15, 2019

(87) PCT Pub. No.: WO2018/162006
PCT Pub. Date: Sep. 13, 2018

(65) Prior Publication Data
US 2019/0376421 A1 Dec. 12, 2019

(30) Foreign Application Priority Data
Mar. 9, 2017 (DE) .................. 10 2017 104 981

(51) Int. Cl.
*F16B 2/24* (2006.01)
*F01L 1/344* (2006.01)
(Continued)

(52) U.S. Cl.
CPC .................. *F01L 1/344* (2013.01); *F01L 1/46* (2013.01); *F16B 2/245* (2013.01);
(Continued)

(58) Field of Classification Search
CPC .................. F01L 2001/3443; F01L 1/46; F01L 2013/101; F01L 2820/031; F16B 2/245
(Continued)

(56) References Cited

U.S. PATENT DOCUMENTS 3,091,487 A * 5/1963 Gallagher ............... F16B 2/245
403/381
3,994,050 A * 11/1976 Bub ...................... A47G 1/0638
24/562
(Continued)

FOREIGN PATENT DOCUMENTS

DE 102011080265 A 2/2013
DE 102012003648 B3 3/2013
(Continued)

*Primary Examiner* — Jorge L Leon, Jr.
(74) *Attorney, Agent, or Firm* — Matthew Evans

(57) ABSTRACT

The invention relates to a camshaft adjustment device for changing an angular position of a camshaft relative to a crankshaft of an internal combustion engine. The device comprising an actuator, the actuator having a housing flange, fastening means to lock the housing flange to a housing. A latching section is formed on the housing, and a locking section, which comes to bear axially on the latching section, is formed on the housing flange. The fastening means comprises at least two fastening clips for connecting the housing to the housing flange in a frictional and interlocking manner. Each fastening clip has a first leg with a first latching contour and a second leg with a second latching contour. The first latching contour bears against a latching groove in the latching section, and the second latching contour bears against a latching groove in the locking section.

20 Claims, 1 Drawing Sheet

(51) Int. Cl.
  *F01L 1/46* (2006.01)
  *F01L 13/00* (2006.01)
(52) U.S. Cl.
  CPC . *F01L 2001/3443* (2013.01); *F01L 2013/101* (2013.01); *F01L 2820/031* (2013.01)
(58) Field of Classification Search
  USPC .......................................... 123/90.15, 90.17
  See application file for complete search history.

(56) References Cited

U.S. PATENT DOCUMENTS

| | | | | |
|---|---|---|---|---|
| 4,556,150 | A | * | 12/1985 | Ikumi ..................... F16B 2/245 220/326 |
| 5,203,576 | A | * | 4/1993 | Miyaoh ............... F01N 13/1805 277/598 |
| 2011/0121150 | A1 | * | 5/2011 | Gendraud ............... F16B 2/245 248/229.23 |
| 2012/0045608 | A1 | * | 2/2012 | Huchet ................... F16B 5/121 428/99 |
| 2012/0181814 | A1 | * | 7/2012 | Fournier ................. F16B 2/245 296/136.1 |
| 2013/0234816 | A1 | * | 9/2013 | Grunschlag ............. H01F 7/126 335/278 |
| 2016/0195118 | A1 | * | 7/2016 | Munch-Fals ........... F16B 2/245 24/535 |
| 2017/0002700 | A1 | * | 1/2017 | Bender ................... F01L 1/344 |
| 2019/0014676 | A1 | * | 1/2019 | Nakamura ............... H01R 4/48 |

FOREIGN PATENT DOCUMENTS

| | | | |
|---|---|---|---|
| DE | 102012008484 A1 | 10/2013 | |
| DE | 102013114625 A1 | 6/2015 | |
| DE | 102016221990 A1 | 5/2017 | |
| DE | 102017101279 A1 | 6/2018 | |
| EP | 0697517 A1 * | 2/1996 | ......... F02M 35/0203 |
| WO | 2017984662 A1 | 5/2017 | |

* cited by examiner

CAMSHAFT ADJUSTMENT DEVICE FOR AN INTERNAL COMBUSTION ENGINE

CROSS REFERENCE TO RELATED APPLICATIONS

This application is the U.S. National Phase of PCT Application No. PCT/DE2018/100209 filed on Mar. 8, 2018 which claims priority to DE 10 2017 104 981.9 filed on Mar. 9, 2017, the entire disclosures of which are incorporated by reference herein.

TECHNICAL FIELD

This disclosure relates to a camshaft adjustment device for changing the angular position of a camshaft relative to a crankshaft of an internal combustion engine, said device comprising an actuator.

The disclosure is in the field of proportional magnets used as electromagnetic actuating devices for actuating hydraulic directional control valves. An electromagnetic actuating device is used as a central magnet for controlling a hydraulic camshaft adjuster of an internal combustion engine, for example. The disclosure can be employed with electromechanical camshaft adjusters for internal combustion engines. In this case, an actuator designed as an electric motor is provided for the adjustment of the adjusting shaft. Such electric motors generally comprise a stator unit having a sensor function, a rotor subassembly, and a housing unit.

BACKGROUND

DE 10 2012 003 648 B3 discloses a proportionately acting electromagnet having a plastic overmolding with an integrally molded fastening flange. The fastening flange includes molded elements, which, in interaction with molded elements on the housing, allow mounting of the electromagnet on and partially in the housing by pressing in axially and twisting. The molded elements hold the electromagnet on and partially in the housing axially and against twisting by means of a latching action, which hinders the rotary motion. Springs consisting of sheet metal perform both the axial preloading for the mounting of the electromagnet and the spring latching for maintaining the rotational position. The preloading forces of the springs for mounting the electromagnet and for latching during the rotation of the electromagnet are produced during assembly by integrally molded bevels on the molded elements. The configuration of the seal which seals off the radial gap between the electromagnet and the housing ensures that it is matched to a low axial assembly force.

DE 10 2011 080 265 A1 furthermore discloses an electric motor having a housing unit, wherein the electric motor is configured as an actuating motor of a camshaft adjuster for an internal combustion engine. The housing unit has an integrally molded plastic flange and a deep drawn housing at least partially surrounded by said plastics material.

DE 10 2016 221 990 A1 shows an electromagnetic actuating device having a housing flange that has a latching contour. The actuating device is fastened with the aid of a latching clip, which has two legs and a connecting section. A latching section is formed on each of the legs. The latching section interacts in such a way with a latching contour of the component accommodating the electromagnetic actuating device that permanent fastening of the electromagnetic actuating device on the component accommodating the actuating device is made possible. The latching contour on the receiving component is embodied as a groove into which the latching clip engages by means of its latching section, which is embodied as a recess facing the opposite leg. With the aid of the recess in each leg, a positive joint is established between the actuating device and the receiving component.

DE 10 2013 114 625 A1 shows another embodiment of an electromagnetic actuating device. A description is given of an electromagnetic actuator having a fastening means for fixing the actuator on an engine element. The fastening means have positive engagement means as an anti-rotation means, which are designed and arranged in such a way that the actuator can be adjusted toward the engine element, into an assembly position, by a purely translational assembly movement. To secure it, leaf springs are pushed into an opening, wherein the opening is formed by a housing flange and a mating contour of a component which accommodates the actuator.

The problem addressed by the present disclosure is that of providing a camshaft adjustment device, comprising an actuator having a housing flange and comprising a housing which accommodates the housing flange, which features improved assembly.

SUMMARY

The solution to this problem results from the features, advantageous developments and embodiments of the disclosure that are described herein.

A camshaft adjustment device, according to the disclosure, for changing the angular position of a camshaft relative to a crankshaft of an internal combustion engine, comprises an actuator for actuating a hydraulic valve. The actuator has a housing flange, and a fastening means is provided to retain the housing flange on a housing. A latching section is formed on the housing, and a retaining section, which comes to bear axially on the latching section, is formed on the housing flange. The fastening means comprises at least two fastening clips for connecting the housing to the housing flange in a positive and a nonpositive manner. Each fastening clip has a first leg with a first latching contour and a second leg with a second latching contour. The first latching contour of the first leg alone is provided to come to bear against a latching groove in the latching section, and the second latching contour of the second leg alone is provided to come to bear against a latching groove in the retaining section.

The camshaft adjustment device can be of electromechanical design and can have an actuator designed as an electric motor. It is likewise also possible for the camshaft adjustment device to be of electromagnetic design and to have an actuator designed as a proportional magnet, which is provided for the actuation of hydraulic directional control valves.

The actuator of the camshaft adjustment device, in particular the housing flange of the actuator, is mounted on the housing, in particular on a cover of a chain case. In principle, however, it is also possible for the housing accommodating the actuator to be the actual cover of a timing mechanism, e.g. the cover of a chain drive. The housing flange can be produced from a metallic material, but a component produced from a plastic or component overmolded with plastic is also conceivable. The housing and the latching section formed on the housing can be produced from a metallic material.

The retention of the housing flange on the housing is accomplished by the fastening means when the housing flange bears axially against the housing. To fix the housing flange axially on the housing, the at least two fastening clips are connected, on the one hand, to the latching section and, on the other hand, to the retaining section. A fastening clip should be taken to mean a clamp which connects two elements positively and nonpositively. The fastening clips can be formed from a metallic material, in particular a spring steel, or from a flexible plastic. The respective fastening clips can advantageously be pushed radially onto the latching section of the housing in order to fix the housing and the housing flange at least axially.

The first latching contour and the second latching contour of each fastening clip can be connected to one another by a connecting leg. In particular, the connecting leg is of arc-shaped design. The arc-shaped design of the connecting leg advantageously results in a spring action of the fastening clip as the housing flange is locked to the housing, thus ensuring a positive and nonpositive joint. Consequently, the fastening clip is under a preload in a locked state, thereby preventing play and relative movement between the housing flange and the housing.

According to an illustrative embodiment, two buckle contours are formed on the second leg of each fastening clip, wherein a respective pin element formed on the retaining section passes through each buckle contour, wherein the respective pin elements are provided for the purpose of receiving each fastening clip with play on the housing flange. In other words, the second leg of the fastening clip is mounted with play on the housing flange. In the locked state, the first leg of the fastening clip is connected positively and nonpositively to the housing, and the second leg of the fastening clip is connected positively and nonpositively to the housing flange.

The two buckle contours of each fastening clip have a respective opening, wherein the opening can be of square or rectangular design. As an alternative, a circular opening is also conceivable. The respective pin elements formed on the retaining section pass through the opening in each buckle contour, wherein the cross section of each pin element is smaller than the cross section of the opening in each buckle contour. The term "pass through" should be taken to mean that each pin element is passed through the opening in the respective buckle contour. In other words, the pin element is accommodated in a freely movable manner in the respective buckle contour.

As a further embodiment, the first leg of each fastening clip has an assembly tab for locking the housing flange to the housing. The fastening clip can pivot in a locking direction about a fulcrum by virtue of an actuation of the assembly tab, wherein the first latching contour latches into the latching groove in the latching section. The assembly tab is actuated by a pressing action in the axial direction of the housing. A fulcrum is taken to mean the contact point between the latching contour and the latching groove of the housing flange, about which the fastening clip is pivoted during the actuation of the assembly tab. Through the entry of the latching contour into the latching groove of the latching section, the fastening clip is fixed, and the housing flange is thus connected to the housing. In the locked state, the geometrical design of the fastening clip ensures simultaneous reception of the first latching contour in the latching groove of the latching section and of the second latching contour in the latching groove of the retaining section.

The second leg of each fastening clip can have a disassembly tab for unlocking the housing flange from the housing. It is advantageous if the disassembly tab is formed at an acute angle to the surface of the housing flange in the locked state, wherein each fastening clip pivots in an unlocking direction about the fulcrum by virtue of an actuation of the disassembly tab. At a distal end section of the disassembly tab, a pressure point is provided, at which the disassembly tab is actuated with a pressing action, wherein a lever arm is formed between the pressure point and the fulcrum. The angle of the disassembly tab relative to the surface of the housing flange and the length of the lever arm are provided for rapid and simple disassembly of the actuator.

As a further embodiment, the housing flange has an orientation contour for the alignment of the actuator on the housing. The orientation contour can interact positively with a housing contour formed in a manner substantially complementary thereto and, in particular, is used to position the at least two fastening clips on the housing.

BRIEF DESCRIPTION OF THE DRAWINGS

Further measures that improve the disclosure are illustrated in greater detail below, together with the description of an illustrative embodiment of the disclosure, by means of the four figures, wherein identical or similar elements are provided with the same reference characters. In the drawings.

DETAILED DESCRIPTION OF THE EMBODIMENTS

Figure 1:
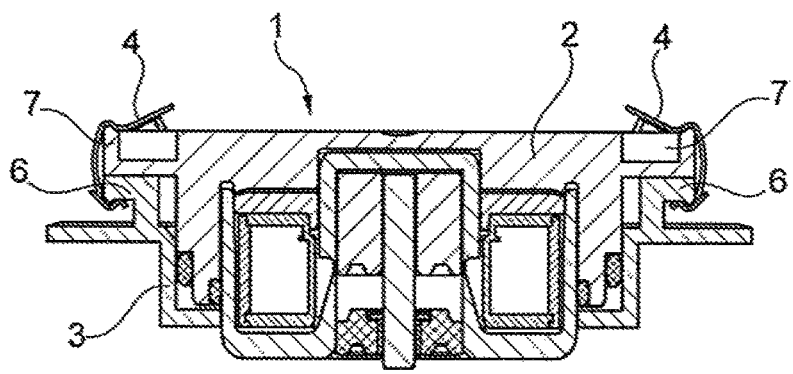
FIG. 1 shows a schematic section intended to illustrate the arrangement of a housing flange on a housing of a camshaft adjustment device.
Figure 2:
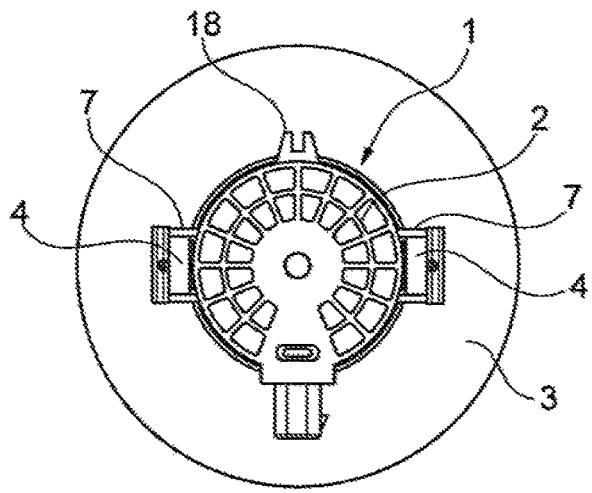
FIG. 2 shows a schematic plan view of the housing flange.

According to both FIGS. 1 and 2, a camshaft adjustment device according to the disclosure, which is illustrated only in part here, comprises an actuator 1, not described in further detail here, having a housing flange 2. Fastening means for retaining the housing flange 2 on a housing 3 are provided on the actuator 1, wherein a latching section 6 is formed on the housing 3, and a retaining section 7, which comes to bear axially on the latching section 6, is formed on the housing flange 2. The fastening means comprise two fastening clips 4 for connecting the housing 3 to the housing flange 2 in a positive and a nonpositive manner. According to FIG. 2, the housing flange 2 furthermore has an orientation contour 18 for the alignment of the actuator 1 on the housing 3.

Figures 3A, 3B:
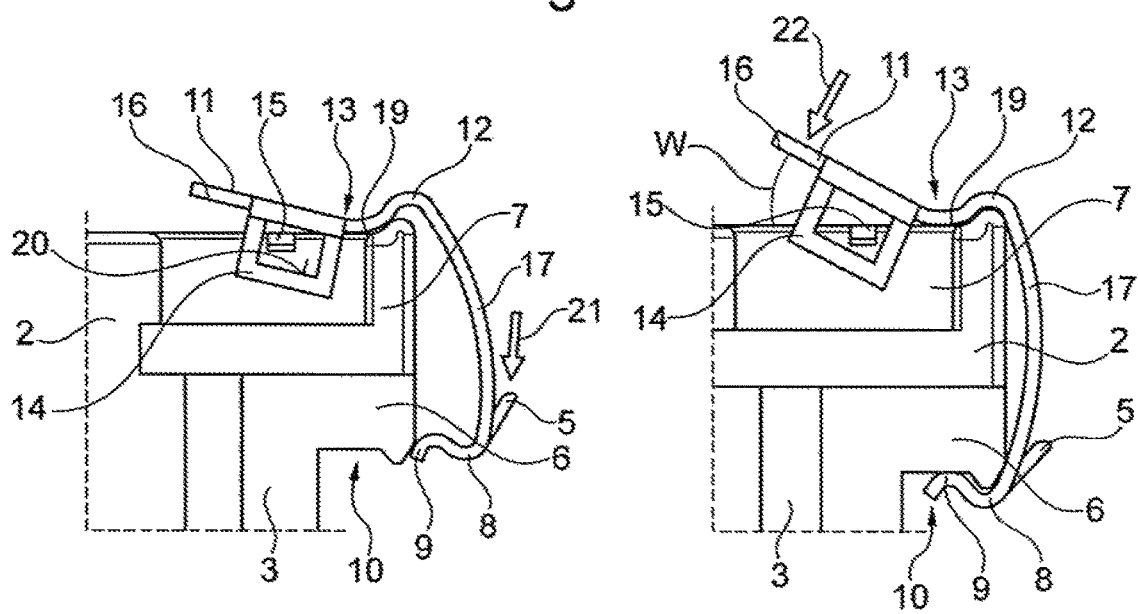
FIG. 3a shows a schematic detail section through a fastening clip in the unlocked state.
FIG. 3b shows a schematic detail section through the fastening clip in the locked state.

FIGS. 3a and 3b show a detail section through the fastening clip 4. The fastening clip 4 has a first leg 8 with a first latching contour 9 and a second leg 11 with a second latching contour 12. The first latching contour 9 and the second latching contour 12 of each fastening clip 4 are connected to one another by a connecting leg 17, which is of arc-shaped design. The first leg 8 of each fastening clip 4 furthermore has an assembly tab 5 for locking the housing flange 2 to the housing 3. The fastening clip 4 can be pivoted into a locked state in a locking direction 21 about a fulcrum 19 by a pressing actuation of the assembly tab 5. The fastening clip 4 can be released from the locked state by actuation of a disassembly tab 16 formed on the second leg 11, wherein the fastening clip 4 can be pivoted about the fulcrum 19 in an unlocking direction 22 into an unlocked state. Two buckle contours 14 are formed on the second leg 11 of each fastening clip 4, wherein only one buckle contour 14 is visible owing to the sectional view. A respective pin element 15 formed on the retaining section 7 passes through each buckle contour 14, wherein each fastening clip 4 is fastened with play on the housing flange 2 by means of the respective pin element 15. The pin element 15 is passed through a rectangular opening 20 in the buckle contour 14. In the present case, the cross section of the pin element 15 is rectangular and substantially smaller than the cross section of the rectangular opening 20 in the buckle contour 14.

In FIG. 3a, the fastening clip 4 is illustrated in an unlocked state. In the unlocked state, the housing flange 2 can be released from the housing 3 in the axial direction and can be rotated and positioned relative to the housing 3. The first latching contour 9 of the first leg 8 rests radially and movably against the outer circumferential surface of the latching section 6. When the assembly tab 5 is actuated in the locking direction 21, the fastening clip 4 pivots about the fulcrum 19 from the unlocked state into the locked state, wherein the first latching contour 9 latches into the latching groove 10 in the latching section 6.

According to FIG. 3b, the fastening clip 4 is illustrated in a locked state. The first latching contour 9 is resting against a latching groove 10 in the latching section 6, and the second latching contour 12 is resting against a latching groove 13 in the retaining section 7. The connecting leg 17 is under preload, as a result of which the housing flange 2 is fixed axially on the housing 3 and the retaining section 7 is fixed axially on the latching section 6. In the locked state, the disassembly tab 16 is at an acute angle W to the surface of the housing flange 2. For simplified removal of each fastening clip 4, starting from the locked state, each fastening clip 4 is pivoted about the fulcrum 19 in an unlocking direction 22 by pressing the disassembly tab 16. During the pivoting of the fastening clip 4, the first latching contour 9 slides out of the latching groove 10, thereby releasing the fixing of the housing flange 2 on the housing 3 and enabling the housing flange 2 to be moved axially out of the housing 3.

LIST OF REFERENCE CHARACTERS 1 actuator
2 housing flange
3 housing
4 fastening clip
5 assembly tab
6 latching section
7 retaining section
8 leg
9 latching contour
10 latching groove
11 leg
12 latching contour
13 latching groove
14 buckle contour
15 pin element
16 disassembly tab
17 connecting leg
18 orientation contour
19 fulcrum
20 opening
21 locking direction
22 unlocking direction
W angle

The invention claimed is:

1. A camshaft adjustment device for changing an angular position of a camshaft relative to a crankshaft of an internal combustion engine, the camshaft adjustment device comprising:
an actuator having a housing flange with a retaining section,
a housing having a latching section configured to be in contact with the retaining section,
at least two fastening clips configured to lock the housing to the housing flange with a positive and a nonpositive connection, each fastening clip configured as a one-piece construction including:
a first leg having a first latching contour, and
a second leg having a second latching contour and a disassembly tab, the disassembly tab configured to be pressed so as to unlock the housing flange from the housing,
the first latching contour configured to engage a corresponding first latching groove in the latching section, and the second latching contour configured to engage a corresponding second latching groove in the retaining section,
the first latching contour of each fastening clip pivots about a corresponding fulcrum of the retaining section in a first direction so as to engage the corresponding first latching groove to lock the housing flange to the housing, and
the disassembly tab of each fastening clip pivots about the corresponding fulcrum of the retaining section in a second direction, opposite the first direction, such that the second leg engages the corresponding fulcrum proximate to the second latching contour, and the corresponding first latching contour moves out of the first latching groove, unlocking the housing flange from the housing.

2. The camshaft adjustment device as claimed in claim 1, wherein the first latching contour and the second latching contour of each fastening clip are connected to one another by a connecting leg.

3. The camshaft adjustment device as claimed in claim 2, wherein the connecting leg of each fastening clip is arc-shaped.

4. The camshaft adjustment device as claimed in claim 1, wherein two buckle contours are formed on the second leg of each fastening clip, and a respective pin element formed on the retaining section passes through each buckle contour, wherein the respective pin elements are configured to receive each fastening clip and allow play between each fastening clip and the housing flange.

5. The camshaft adjustment device as claimed in claim 4, wherein the first leg of each fastening clip has an assembly tab configured to lock the housing flange to the housing.

6. The camshaft adjustment device as claimed in claim 1, wherein the disassembly tab is formed integrally with the second leg.

7. The camshaft adjustment device as claimed in claim 6, wherein the disassembly tab is arranged at a first end of each fastening clip, and the first latching contour is arranged at a second end of each fastening clip.

8. The camshaft adjustment device as claimed in claim 1, wherein the disassembly tab of each fastening clip is formed at an acute angle to a surface of the housing flange in a locked state.

9. The camshaft adjustment device as claimed in claim 1, wherein the housing flange has an orientation contour configured to align the actuator on the housing.

10. A camshaft adjustment device for changing an angular position of a camshaft relative to a crankshaft of an internal combustion engine, the camshaft adjustment device comprising:

an actuator having a housing flange with a retaining section, a housing having a latching section, at least two fastening clips configured to lock the housing to the housing flange, each fastening clip configured as a one-piece construction including:

a first end having a first leg, the first leg including a first latching contour, a second end having a second leg configured to receive a disassembly pressing force, the second leg including a disassembly tab and a second latching contour, the second latching contour configured to engage a corresponding second latching groove arranged on the retaining section, and an arc-shaped connecting leg arranged to connect the first latching contour to the second latching contour, the arc-shaped connecting leg configured to extend in an axial direction of the actuator, the second leg having a first distal end and a second fulcrum end, the second fulcrum end configured to engage and pivot about a corresponding fulcrum arranged on the retaining section, such that when the second leg pivots about the corresponding fulcrum:

in a first direction, the first latching contour engages a corresponding first latching groove arranged on the latching section, and in a second direction, opposite the first direction, the first latching contour disengages the corresponding first latching groove on the latching section.

11. The camshaft adjustment device as claimed in claim 10, wherein two buckle contours are formed on the second leg of each fastening clip, and a respective pin element formed on the retaining section passes through each buckle contour, wherein the respective pin elements are configured to receive each fastening clip and allow play between each fastening clip and the housing flange.

12. The camshaft adjustment device as claimed in claim 10, further comprising an assembly tab arranged on each fastening clip.

13. The camshaft adjustment device as claimed in claim 12, wherein actuation of the assembly tab of each fastening clip in a locking direction causes the first leg to pivot about the respective fulcrum in the first direction.

14. The camshaft adjustment device as claimed in claim 10, further comprising a disassembly tab formed integrally into the second leg of each fastening clip, the disassembly tab configured at an end opposite the first latching contour.

15. The camshaft adjustment device as claimed in claim 14, wherein the disassembly tab forms a lever arm with the corresponding fulcrum.

16. The camshaft adjustment device as claimed in claim 15, wherein the first latching contour and the second latching contour of each fastening clip are connected to one another by an arc-shaped connecting leg.

17. The camshaft adjustment device as claimed in claim 15, wherein the disassembly tab of each retaining clip is formed at an acute angle relative to a surface of the housing flange.

18. A camshaft adjustment device for changing an angular position of a camshaft relative to a crankshaft of an internal combustion engine, the camshaft adjustment device comprising:

a housing including a latching section, an actuator including a housing flange with a retaining section, and at least two fastening clips configured to lock the housing to the housing flange, each fastening clip configured as a one-piece construction including:

a first leg having a first latching contour configured to engage a corresponding first latching groove in the latching section, and a second leg having a second latching contour and a disassembly tab, the second latching contour configured to engage a corresponding second latching groove in the retaining section, and at least a portion of each corresponding second latching groove configured as a fulcrum, the first leg pivots about the corresponding fulcrum in a first direction so as to engage the corresponding first latching groove, defining a locked state, and the second leg configured to be pressed such that the second leg pivots about the corresponding fulcrum in a second direction, opposite the first direction, so as to move the first latching contour out of the corresponding first latching groove, defining an unlocked state.

19. The camshaft adjustment device of claim 18, wherein the second leg of each of the at least two fastening clips is mounted with play relative to the housing flange in the locked state.

20. The camshaft adjustment device of claim 19, wherein the second leg of each fastening clip further comprises a first buckle contour and a second buckle contour that respectively receive a first pin and a second pin formed on the housing flange, so as to allow the play between the second leg and the housing flange.

* * * * *